(12) United States Patent
Pan et al.

(10) Patent No.: US 11,703,713 B2
(45) Date of Patent: Jul. 18, 2023

(54) LIGHT-EMITTING DEVICE AND ELECTRONIC DEVICE INCLUDING THE SAME

(71) Applicant: Innolux Corporation, Miao-Li County (TW)

(72) Inventors: May Pan, Tainan (TW); Fu Kuo, Tainan (TW); Maggy Hsu, Magong (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 17/846,822

(22) Filed: Jun. 22, 2022

(65) Prior Publication Data

US 2022/0404669 A1   Dec. 22, 2022

Related U.S. Application Data

(63) Continuation of application No. 17/344,580, filed on Jun. 10, 2021, now Pat. No. 11,397,350.

(51) Int. Cl.
*G02F 1/13357*   (2006.01)
*F21V 8/00*   (2006.01)

(52) U.S. Cl.
CPC ..... *G02F 1/133603* (2013.01); *G02B 6/0031* (2013.01); *G02B 6/0078* (2013.01); *G02F 1/133605* (2013.01)

(58) Field of Classification Search
None
See application file for complete search history.

(56) References Cited

U.S. PATENT DOCUMENTS

2013/0301298 A1\* 11/2013 Liu ..................... G02B 6/0091
362/613

\* cited by examiner

*Primary Examiner* — Britt D Hanley
(74) *Attorney, Agent, or Firm* — Patterson + Sheridan, LLP

(57) ABSTRACT

A light-emitting device is provided, which includes a circuit board, a plurality of light-emitting elements, a first reflective element, and a second reflective element. The light-emitting elements are arranged on the circuit board. The first reflective element is disposed on the circuit board. The second reflective element is disposed on the circuit board. The first reflective element has a first reflectivity R1. The second reflective element has a second reflectivity R2. The first reflectivity R1 is different from the second reflectivity R2. The first reflectivity R1 and the second reflectivity R2 satisfy the following formula: $0<|(R1-R2)|/\text{Max}(R1, R2)<20\%$.

20 Claims, 11 Drawing Sheets

LIGHT-EMITTING DEVICE AND ELECTRONIC DEVICE INCLUDING THE SAME

CROSS REFERENCE TO RELATED APPLICATIONS

This application is a Continuation of pending U.S. patent application Ser. No. 17/344,580, filed Jun. 10, 2021 and entitled "BACKLIGHT MODULE AND ELECTRONIC DEVICE INCLUDING THE SAME", the entirety of which is incorporated by reference herein.

BACKGROUND

Technical Field

The present disclosure relates to an electronic device, and in particular it relates to a backlight module of an electronic device.

Description of the Related Art

Electronic products with panels, such as displays, smartphones, tablet computers, notebook computers, and televisions, have become indispensable necessities in modern society. With the flourishing development of these electronic products, consumers have high expectations regarding their quality, functionality, or price.

However, these electronic products have not yet met consumer expectations in various aspects. There are still some issues existing in the electronic product. For example, in an electronic device with a backlight module, the tape disposed adjacent to the light-emitting elements may affect the extraction efficiency of the backlight module. The development of a structural design of the backlight module that can improve the extraction efficiency is still one of the goals in the current industry.

SUMMARY

In accordance with some embodiments of the present disclosure, a light-emitting device is provided. The light-emitting device includes a circuit board, a plurality of light-emitting elements, a first reflective element, and a second reflective element. The plurality of light-emitting elements are arranged on the circuit board. The first reflective element is disposed on the circuit board. The second reflective element is disposed on the circuit board. The first reflective element has a first reflectivity R1. The second reflective element has a second reflectivity R2. The first reflectivity R1 is different from the second reflectivity R2. The first reflectivity R1 and the second reflectivity R2 satisfy the following formula: $0<|(R1-R2)|/\text{Max}(R1, R2)<20\%$.

In accordance with some embodiments of the present disclosure, an electronic device is provided. The electronic device includes a display panel and a light-emitting device. The light-emitting device is disposed below the display panel. The light-emitting device includes a circuit board, a plurality of light-emitting elements, a first reflective element, and a second reflective element. The plurality of light-emitting elements are arranged on the circuit board. The first reflective element is disposed on the circuit board. The second reflective element is disposed on the circuit board. The first reflective element has a first reflectivity R1. The second reflective element has a second reflectivity R2. The first reflectivity R1 is different from the second reflectivity R2. The first reflectivity R1 and the second reflectivity R2 satisfy the following formula: $0<|(R1-R2)|/\text{Max}(R1, R2)<20\%$.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
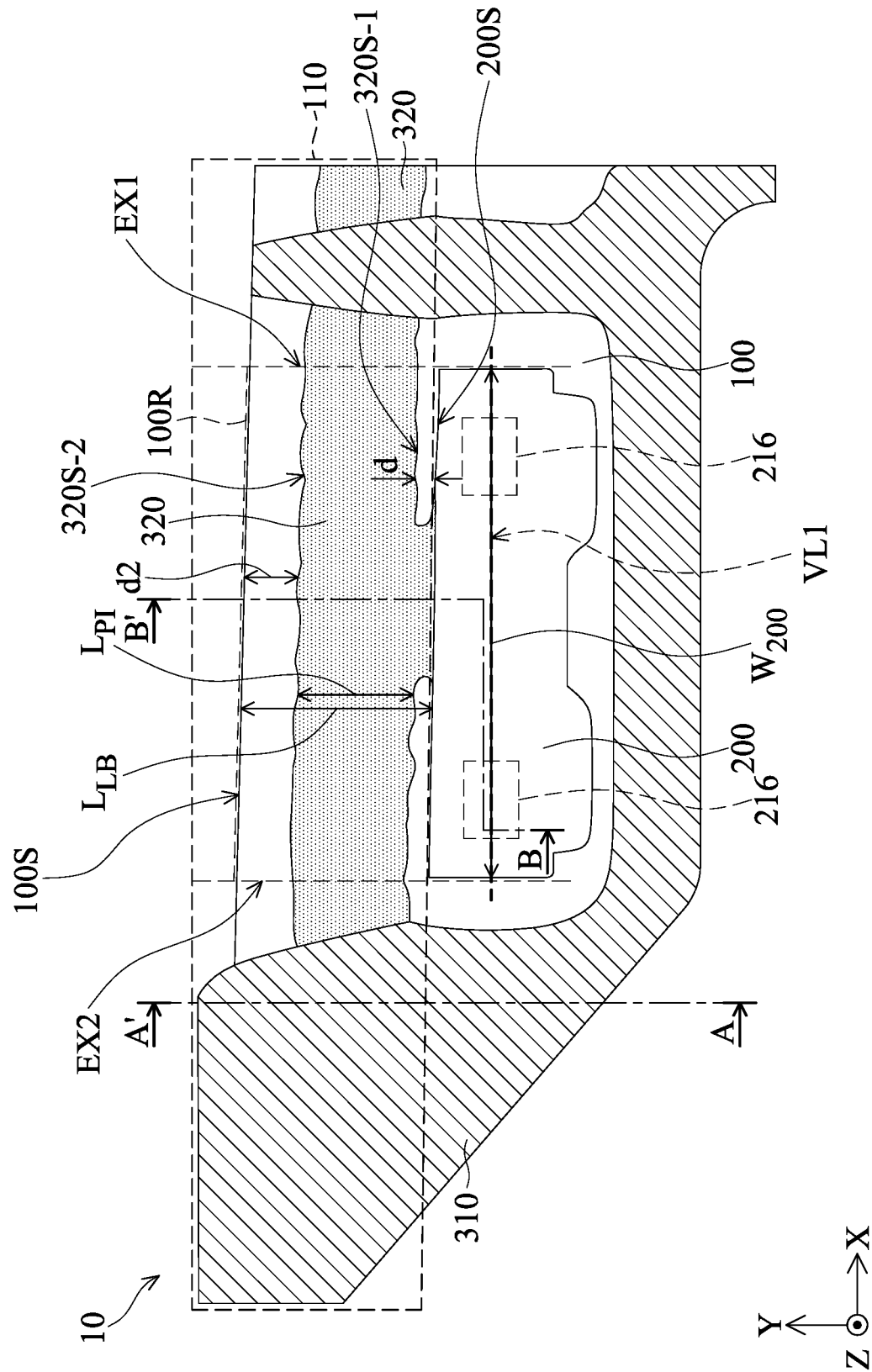
FIG. 1 is a partial top-view diagram of a backlight module in accordance with some embodiments of the present disclosure.

The backlight module and electronic device of the present disclosure are described in detail in the following description. It should be understood that in the following detailed description, for purposes of explanation, numerous specific details and embodiments are set forth in order to provide a thorough understanding of the present disclosure. The elements and configurations described in the following detailed description are set forth in order to clearly describe the present disclosure. The embodiments are used merely for the purpose of illustration. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

The present disclosure can be understood by referring to the following detailed description in connection with the accompanying drawings. It should be noted that, in order to allow the reader to easily understand the drawings, several drawings in the present disclosure only depict a portion of the electronic device, and the specific elements in the drawings are not drawn to scale. In addition, the number and size of each element in the drawings are only for illustration and the scope of the present disclosure is not limited thereto.

Throughout the present disclosure and the appended claims, certain terms are used to refer to specific elements. Those skilled in the art should understand that electronic device manufacturers may refer to the same element with different names. The present disclosure does not intend to distinguish between elements that have the same function but different names. In the specification and claims, the terms "comprising", "including", "having" and the like are open-ended phrases, so they should be interpreted as "including but is not limited to . . . ". Therefore, when the terms "comprising", "including" and/or "having" are used in the description of the present disclosure, they specify the corresponding features, regions, steps, operations and/or components, but do not exclude the existence of one or more corresponding features, regions, steps, operations and/or components.

Directional terms mentioned in the present disclosure, such as "upper", "lower", "front", "rear", "left", "right", etc., are only the directions referring to the drawings. Therefore, the directional terms are used for illustration, not for limiting the scope of the present disclosure. The drawings depict general features of methods, structures, and/or materials used in particular embodiments. However, these drawings should not be interpreted as defining or limiting the scope or property encompassed by these embodiments. For example, for clarity, the relative sizes, thicknesses, and positions of the various layers, regions, and/or structures may be reduced or enlarged.

When a corresponding component (such as a layer or region) is referred to as "(disposed or located) on another component", it may be directly (disposed or located) on another component, or there may be other components between them. On the other hand, when a component is referred to as "directly (disposed or located) on another component", there is no component existing between them. In addition, when a component is referred to as "(disposed or located) on another component", the two have an upper-lower relationship in a top-view direction, and this component may be above or below another component, and the upper-lower relationship depends on the orientation of the device.

The terms "about", "equal to", "the same as", "identical to", "substantially" or "approximately" are generally interpreted as being within 20% of a given value or range, or within 10%, 5%, 3%, 2%, 1% or 0.5% of the given value or range.

The ordinal numbers used in the specification and claims, such as the terms "first", "second", etc., are used to modify an element, which itself does not mean and represent that the element (or elements) has any previous ordinal number, and does not mean the order of a certain element and another element, or the order in the manufacturing method. The use of these ordinal numbers is used to make a component with a certain name can be clearly distinguished from another component with the same name. The same words may not be used in the claims and the specification. Accordingly, the first component in the specification may be the second component in the claims.

It should be noted that the following embodiments can replace, recombine, and combine features in several different embodiments to complete other embodiments without departing from the spirit of the present disclosure. The features between the various embodiments can be combined and used arbitrarily as long as they do not violate or conflict the spirit of the present disclosure.

In the present disclosure, the length and the width of the component can be measured from an optical microscope image, and the thickness of the component can be measured from a cross-sectional image in an electron microscope, but it is not limited thereto. In addition, certain errors may exist between any two values or directions used for comparison. If the first value is equal to the second value, it implies that there may be a 10% error between the first value and the second value; if the first direction is perpendicular to the second direction, the angle between the first direction and the second direction may be between 80 degrees and 100 degrees; if the first direction is parallel to the second direction, the angle between the first direction and the second direction may be between 0 degrees and 10 degrees.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the present disclosure, a backlight module and an electronic device including the backlight module are provided. The backlight module includes a first reflective element and a second reflective element that are disposed adjacent to light-emitting elements and are arranged in a specific configuration. In addition, the reflectivity of the first reflective element and the second reflective element are designed to follow a certain formula. With such a specific configuration, the extraction efficiency of the backlight module can be improved. The extraction efficiency is the proportion of light emitted from the backlight module to the display panel. Therefore, the performance or reliability of the electronic device (e.g., a display device) can be enhanced.

In some embodiments, the electronic device may include a display device, a light-emitting device, a touch device, a sensing device, a tiled device, or a combination thereof, but it is not limited thereto. The electronic device may include a bendable or flexible electronic device. In some embodiments, the electronic device may include light-emitting diode (LED), liquid crystal, fluorescence, phosphor, quantum dot (QD), another suitable medium, or a combination thereof, but it is not limited thereto. The light-emitting diode may include, for example, an organic light-emitting diode (OLED), an inorganic light-emitting diode, such as a mini light-emitting diode (mini LED), a micro light-emitting diode (micro LED) or a quantum dot light-emitting diode (QLED/QDLED), another suitable material or any combination of the foregoing, but it is not limited thereto. In addition, the shape of the electronic device may be a rectangle, a circle, a polygon, an irregular shape, a shape with a curved edge, or another suitable shape. In addition to the display panel, the electronic device may also include peripheral systems such as a driving system, a control system, a light source system, a display device will be used as an example to describe the electronic device, but the present disclosure is not limited thereto.

Figure 2A:
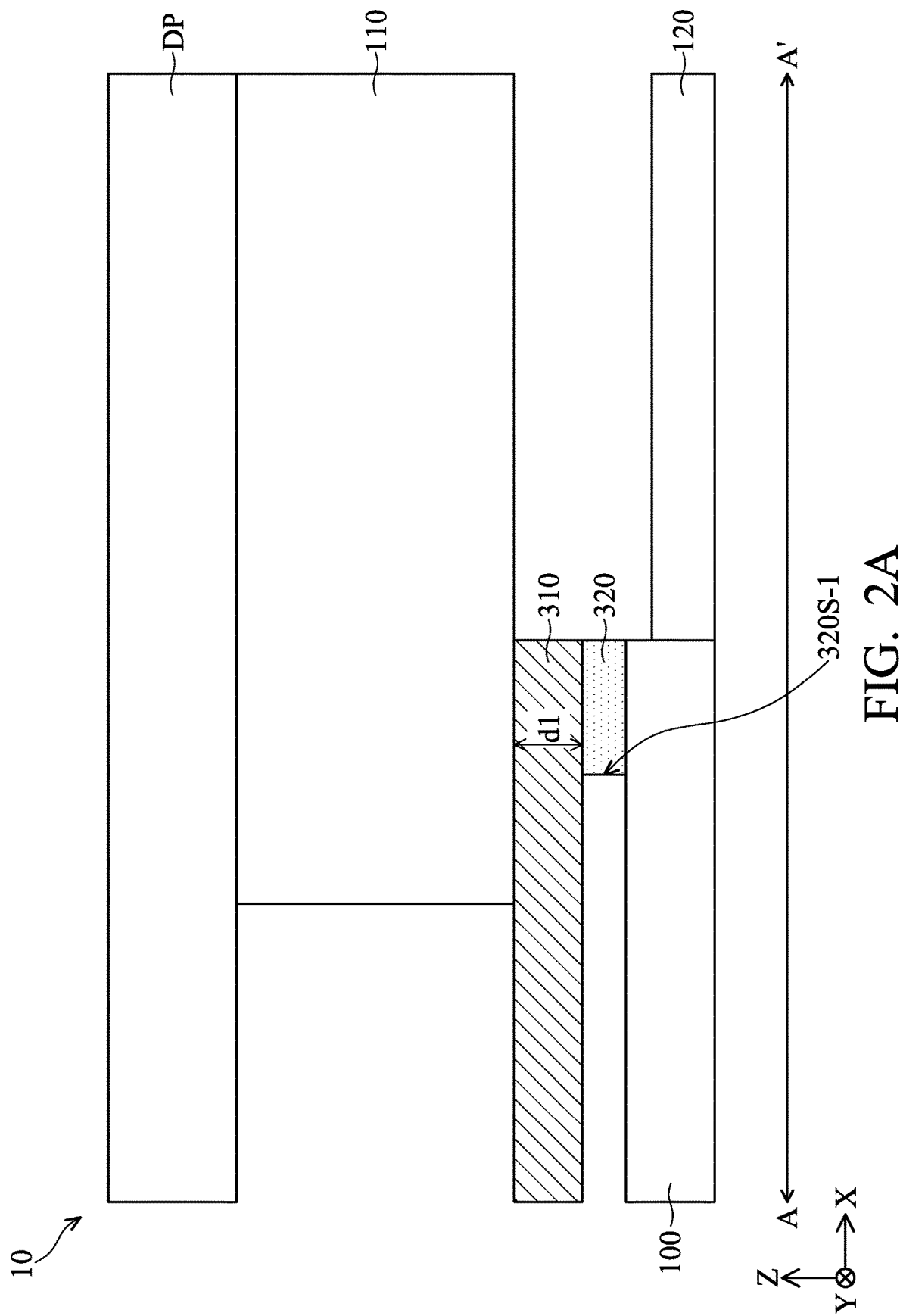
FIG. 2A is a cross-sectional diagram of the backlight module taken along section line A-A' in FIG. 1 in accordance with some embodiments of the present disclosure.
Figure 2B:
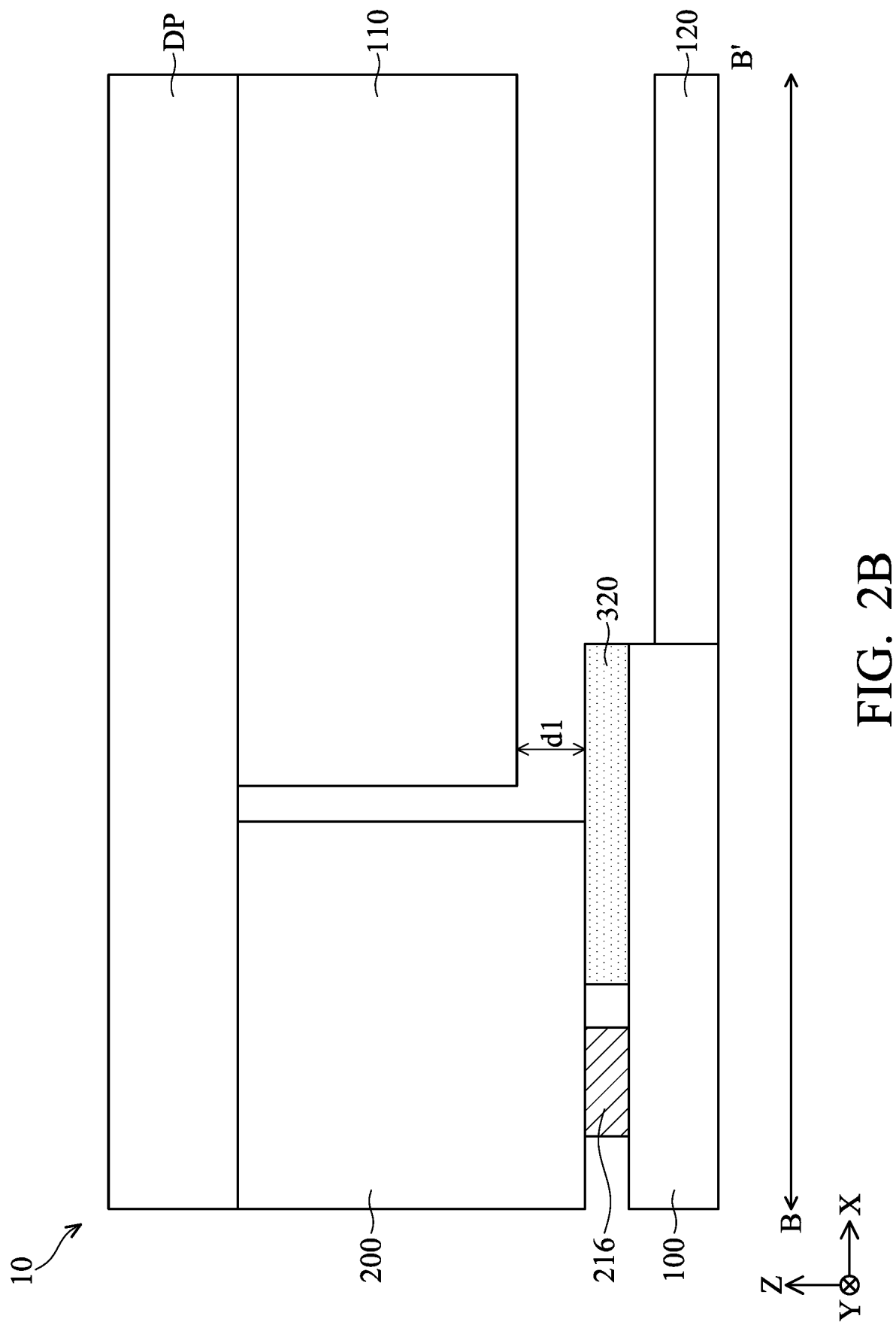
FIG. 2B is a cross-sectional diagram of the backlight module taken along section line B-B' in FIG. 1 in accordance with some embodiments of the present disclosure.

In some embodiments, an electronic device is provided, and the electronic device includes a display panel DP and a backlight module 10. The backlight module 10 may be disposed below the display panel. In other words, the display panel DP may be closer to the viewer than the backlight module 10. Specifically, refer to FIG. 1, FIG. 2A and FIG. 2B. FIG. 1 is a partial top-view diagram of the backlight module 10 in accordance with some embodiments of the present disclosure. FIG. 2A is a cross-sectional diagram of the backlight module 10 taken along section line A-A' in FIG. 1 in accordance with some embodiments of the present disclosure. FIG. 2B is a cross-sectional diagram of the backlight module 10 taken along section line B-B' in FIG. 1 in accordance with some embodiments of the present disclosure.

It should be understood that only some elements of the backlight module 10 are illustrated in FIG. 1, FIG. 2A and FIG. 2B for clarity. In some embodiments, additional features or elements may be optionally added to the backlight module 10. In some embodiments, some features of the backlight module 10 described below may be optionally replaced or omitted. In addition, some elements illustrated in FIG. 2A and FIG. 2B are omitted in FIG. 1 for clarity.

As shown in FIG. 1, FIG. 2A and FIG. 2B, the backlight module 10 may include a circuit board 100, a plurality of light-emitting elements 200, a light guide plate 110, a first reflective element 310 and a second reflective element 320. It should be understood that, FIG. 1 only illustrates one light-emitting element 200 for clarity. The backlight module 10 may include a plurality of light-emitting elements 200, and the light-emitting elements 200 may be arranged on the circuit board 100 along a first direction X. In addition, the light guide plate 110 may be disposed on the circuit board 100. The light guide plate 110 may be partially overlapped with the circuit board 100 along a normal direction Z of the circuit board 100. Moreover, the first reflective element 310 and the second reflective element 320 may be disposed between the light guide plate 110 and the circuit board 100. In some embodiments, the first reflective element 310 may be disposed between the light guide plate 110 and the second reflective element 320.

The circuit board 100 may include a printed circuit board (PCB) or flexible printed circuit (FPC), but it is not limited thereto. The circuit board 100 may be electrically connected to the light-emitting elements 200 and control the light-emitting elements 200.

In some embodiments, the light-emitting elements 200 may include, but are not limited to, inorganic light-emitting diodes, micro-LEDs, mini-LEDs. In some embodiments, the light-emitting elements 200 may include a packaging component and a bare die (such as the micro-LED, or the mini-LED) in the packaging component. In some embodiments, the light-emitting elements 200 may include surface-mount devices (SMD) packaging of light-emitting diodes, chip-on-board (COB) packaging of light-emitting diodes, another suitable packaging form, or a combination thereof, but it is not limited thereto. The detailed structure of the light-emitting elements 200 will be described in the following context.

Referring to FIG. 2A and FIG. 2B, in some embodiments, the backlight module 10 may further include a third reflective element 120 disposed below the light guide plate 110. In other words, the light guide plate 110 may be between the third reflective element 120 and the viewer. In some embodiments, the third reflective element 120 may be disposed adjacent to the circuit board 100, and the third reflective element 120 may be or not be in contact with the circuit board 100. In some embodiments, the light guide plate 110 can guide a light emitted from the light-emitting elements 200 to the display panel DP. The reflective element 120 can be used to reflect part of the light emitted from the light-emitting element 200 and transmitted out from the light guide plate 110, and/or reflect the light escaped from the light guide plate 110 back into the light guide plate 110 again.

It should be understood that although the light guide plate 110 is omitted in FIG. 1, the light guide plate 110 would be disposed in front of the light-emitting element 200 in FIG. 1. In other words, the circuit board has a side 100S, the side 100S is adjacent to the light guide plate 110 and is extending along the first direction X, part of the light guide plate 110 may overlap with the third reflective element 120, and another part of the light guide plate 110 may overlap with the side 100S along the normal direction Z of the circuit board 100. It should be noted that, the expression "the side (or the element) extending along a direction A (such as the first direction X)" means that there may be 20 degrees difference between an extending direction of the side (or element) and the direction A.

In addition, as shown in FIG. 1, the circuit board 100 may have a plurality of light-reflecting regions 100R, and the light-emitting elements 200 may emit a light toward the light-reflecting regions 100R. In some embodiments, the light guide plate 110 may be overlapped with the light-reflecting regions 100R along the normal direction Z of the circuit board 100. In some embodiments, a virtual line VL1 may be through a site of the light-emitting element 200 with a maximum width $W_{200}$, the light-reflecting region 100R may be defined by a region enclosed by the virtual line VL1, a virtual line EX1, a virtual line EX2 and a side 100S of the circuit board 100. Specifically, in some embodiments, when the light-emitting elements 200 includes the packaging component, the site of the light-emitting element 200 with the maximum width $W_{200}$ may refer to a site of the packaging component of the light-emitting element 200 with the maximum width. In addition, the site with the maximum width $W_{200}$ may be substantially extended along the first direction X. The site of the light-emitting element 200 with the maximum width $W_{20}$ has two ends, the virtual line EX1 extending perpendicular to the first direction X and through one of the two ends of the site of the light-emitting element 200, and the virtual line EX2 extending perpendicular to the first direction X and through the other one of the two ends of the site of the light-emitting element 200. In addition, the side 100S of the circuit board 100 may refer to a side that is adjacent to the light guide plate 110 and extends along the first direction X. In some embodiments, the side 100S of the circuit board 100 may be overlapped with the light guide plate 110 along a normal direction Z of the circuit board 100.

In addition, as shown in FIG. 1, the first reflective element 310 may surround the light-emitting element(s) 200, and the second reflective element 320 may be disposed corresponding to the light-reflecting region(s) 100R. Specifically, in some embodiments, the expression "the first reflective element 310 surrounds the light-emitting element(s) 200" means that the first reflective element 310 may partially surround or entirely surround the light-emitting element(s) 200. In some embodiments, the expression "the second reflective element 320 is disposed corresponding to the light-reflecting region 100R" means that the second reflective element 320 is at least partially overlapped with the light-reflecting region(s) 100R along a normal direction Z of the circuit board 100.

In some embodiments, the first reflective element 310 may include a first white material or other reflective materials, and the second reflective element 320 may include a second white material or other reflective materials. In some embodiments, the first reflective element 310 may include a base layer with white material or other reflective material, but it is not limited thereto. In some embodiments, the base layer may include polyethylene terephthalate (PET), or another suitable material, but it is not limited thereto. In some embodiments, the first reflective element 310 may be sandwiched between a first adhesive layer (not illustrated) and a second adhesive layer (not illustrated) to form a tape. In other words, the first adhesive layer (not illustrated) and the second adhesive layer (not illustrated) may be disposed on both sides of the base layer. In some embodiments, the first reflective element 310 may be attached to the light guide plate 110 through the first adhesive layer (not illustrated), and the first reflective element 310 (such as the base layer) may be attached to the circuit board 100 through the second adhesive layer (not illustrated), but it is not limited thereto.

In some embodiments, the second white material may include polyimide (PI) with white color or another suitable material, but it is not limited thereto.

As shown in FIG. 1 and FIG. 2A, in some embodiments, the first reflective element 310 may be disposed between the light guide plate 110 and the second reflective element 320, and the first reflective element 310 may partially surround the light-emitting element(s) 200.

As shown in FIG. 1 and FIG. 2B, in some embodiments, the first reflective element 310 may not be disposed in the light-reflecting region(s) 100R. In other words, the first reflective element 310 may not be overlapped with at least one of the plurality of light-reflecting regions 100R along the normal direction Z of the circuit board 100. In some embodiments, the second reflective element 320 may be disposed corresponding to the light-reflecting region 100R, and the second reflective element 320 may not be in contact with the light guide plate 110. In this way, the total reflection occurring at an interface of the light guide plate 110 may not be reduced. Moreover, the second reflective element 320 disposed corresponding to the light-reflecting region(s) 100R may enhance the reflection of the light emitted from the light-emitting element 200.

Moreover, it should be noted that, the first reflective element 310 may have a first reflectivity R1, the second reflective element 320 may have a second reflectivity R2, and the first reflectivity R1 and the second reflectivity R2 satisfy the following formula: 0≤(R1-R2) I/Max (R1, R2)<20%. That is, the ratio of the absolute value of the difference of the first reflectivity R1 and the second reflectivity R2 to the maximum value of the first reflectivity R1 or the second reflectivity R2 (the one which is greater) may be greater than or equal to 0 and less than 20%. In some embodiments, the absolute value of the difference of the first reflectivity R1 and the second reflectivity R2 to the maximum value of the first reflectivity R1 or the second reflectivity R2 may be greater than or equal to 5% and less than or equal to 18%, for example, 6%, 7%, 8%, 9%, 10%, 11%, 12%, 13%, 14%, 15%, 16%, or 17%, but it is not limited thereto.

In some embodiments, the second reflectivity R2 of the second reflective element 320 may be greater than the first reflectivity R1 of the first reflective element 310. With such a configuration, the second reflective element 320 disposed corresponding to the light-reflecting region 100R may have a better reflection performance. The extraction efficiency of the backlight module 10 therefore may be improved.

In some embodiments, the first reflectivity R1 of the first reflective element 310 may be greater than or equal to 40% and less than or equal to 65% (i.e. 40%≤first reflectivity R1≤65%), or greater than or equal to 45% and less than or equal to 60% (i.e. 45%≤first reflectivity R1≤60%), for example, 50%, or 55%, but it is not limited thereto. In some embodiments, the second reflectivity R2 of the second reflective element 320 may be greater than or equal to 45% and less than or equal to 75% (i.e. 45%≤second reflectivity R2≤75%), or greater than or equal to 50% and less than or equal to 70% (i.e. 50%≤second reflectivity R2≤70%), for example, 55%, 60%, or 65%, but it is not limited thereto.

In an embodiment, the first reflectivity R1 may be 47.13%, the second reflectivity R2 may be 52.10%, and the value of |(R1-R2)|/Max (R1, R2) is 9.54%. In another embodiment, the first reflectivity R1 may be 53.45%, the second reflectivity R2 may be 63.17%, and the value of |(R1-R2)|/Max (R1, R2) may be 15.39%. In another embodiment, the first reflectivity R1 may be 59%, the second reflectivity R2 may be 62%, and the value of |(R1-R2)|/Max (R1, R2) may be 4.83%.

It should be noted that when the first reflective element 310 and the second reflective element 320 are disposed in the specific configuration as described above and have the reflectivity following the above formula (0≤|(R1-R2)|/Max (R1, R2)<20%), the extraction efficiency of the backlight module 10 can be improved. Therefore, the performance or reliability of the electronic device can be enhanced.

Moreover, in some embodiments, the first reflectivity R1 may refer to an average value obtained by measuring the reflectivity of the first reflective element 310 three times, and the three reflectivity of the first reflective element 310 may be respectively obtained by measuring at different parts of the first reflective element 310. In some embodiments, the second reflectivity R2 may refer to an average value obtained by measuring the reflectivity of the second reflective element 320 in the light-reflecting region 100R three times, and the three reflectivity of the second reflective element 320 may be respectively obtained by measuring at different parts of the second reflective element 320 in the light-reflecting region 100R.

In some embodiments, if the tape includes the first adhesive layer (not illustrated), the first reflectivity R1 of the first reflective element 310 may be measured after the first adhesive layer is removed. In some embodiments, the first adhesive layer may be removed by scratching, and the first reflective element 310 may be wiped with ethanol after the scratching, but it is not limited thereto. In some embodiments, a light (such as a testing light) emitted from the halogen lamp is respectively reflected by the first reflective element 310 and/or the second reflective element 320, and the lights reflected by the first reflective element 310 and the second reflective element 320 respectively have corresponding coordinates (u1',v1') and (u2',v2') in a CIE 1976 color space, and u1', v1', u2' and v2' satisfy the following formula: $0 \le \sqrt{(u_2'-u_1')^2+(v_2'-v_1')^2} \le 0.006$. The coordinates (u1',v1') and (u2',v2') represent the chromaticity coordinates of the first reflective element 310 and the second reflective element 320, respectively.

It should be noted that, if the value $\sqrt{(u_2'-u_1')^2+(v_2'-v_1')^2}$ of the first reflective element 310 and the second reflective element 320 is too large (for example, greater than 0.006), the chromaticity difference of the first reflective element 310 and the second reflective element 320 may be too large so that the color of light may be non-uniform.

In some embodiments, the chromaticity coordinate (u1', v1') of the first reflective element 310 may refer to an average value obtained by measuring the chromaticity coordinate of the first reflective element 310 three times, the three chromaticity coordinates of the first reflective element 310 may be respectively obtained by measuring at different parts of the first reflective element 310. In some embodiments, the chromaticity coordinate (u2',v2') of the second reflective element 320 may refer to an average value obtained by measuring the chromaticity coordinate of the second reflective element 320 in the light-reflecting region 100R three times, and the three chromaticity coordinates of the second reflective element 320 may be respectively obtained by measuring at different parts of the second reflective element 320 in the light-reflecting region 100R.

Figure 3:
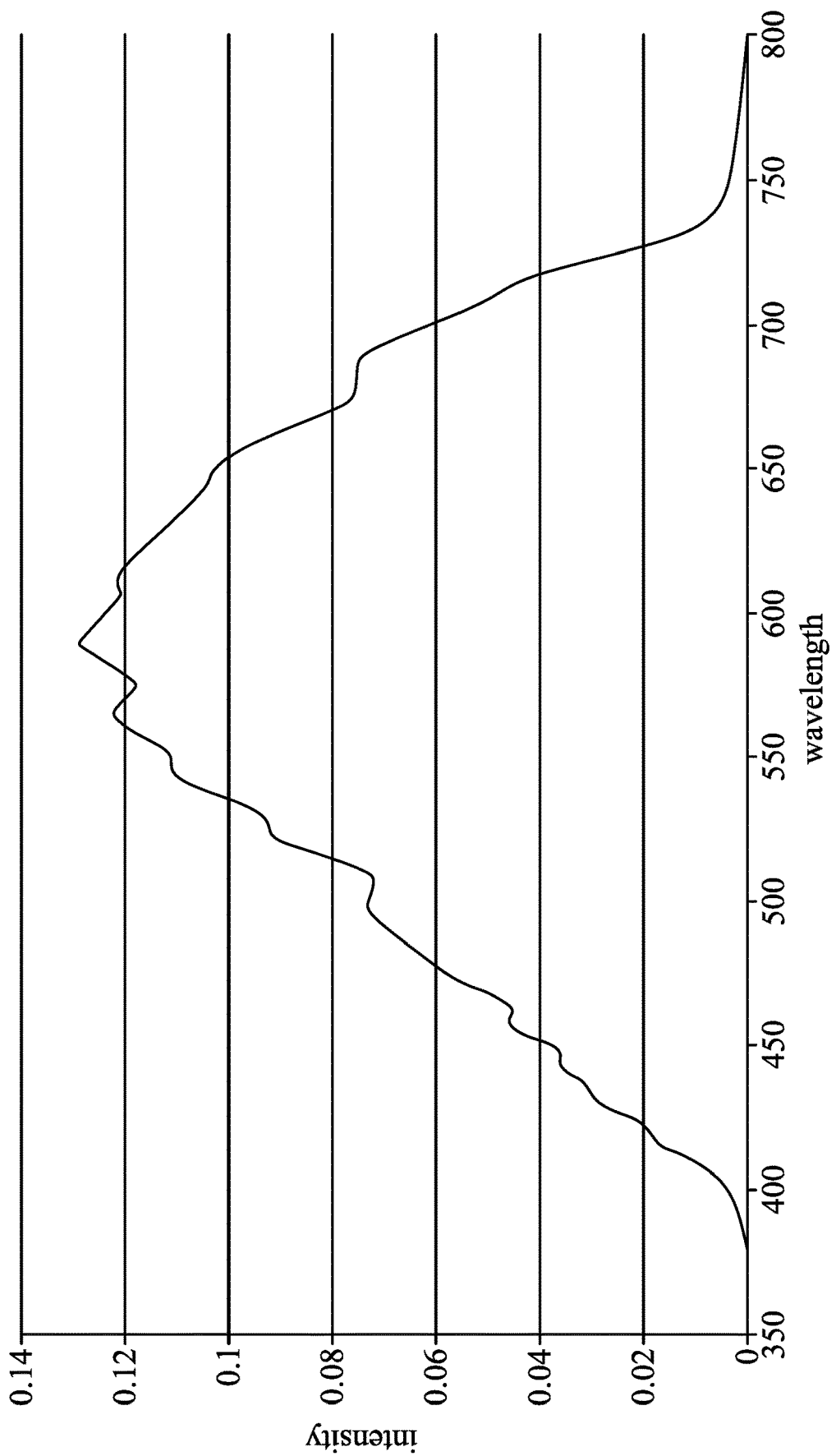
FIG. 3 is a spectrum of the light source that is used for the measurement of reflectivity and chromaticity in accordance with some embodiments of the present disclosure.

In some embodiments, the reflectivity and/or the chromaticity of the first reflective element 310 (and/or the second reflective element 320) can be measured using an angle analyzer (such as DMS series angle analyzers, for example DMS 803 or DMS 903) or other instruments. For example, the light source of the angle analyzer may include visible light (e.g., a wavelength between 380 nm and 780 nm), but it is not limited thereto. In some embodiments, the light source may include halogen lamp or other suitable light source, and the spectrum of the light source is shown in FIG. 3, but it is not limited thereto. As described above, in some embodiments the first reflectivity R1 of the first reflective element 310 is measured after the first adhesive layer (not illustrated) are removed. The same is applied to the measurement of chromaticity. In some embodiments, the reflectivity and/or chromaticity of the first reflective element 310 (and/or the second reflective element 320) can be measured using other suitable instruments.

Table 1 and Table 2 show the measurement results of reflectivity and chromaticity of the first reflective element 310 before and after the first adhesive layer are removed (with and without first adhesive layer).

TABLE 1

|  | Sample 1 | Sample 2 |
|---|---|---|
| first reflectivity R1 (the first reflective element 310 with the first adhesive layer) -measurement 1 | 53.45% | 54.31% |
| first reflectivity R1 (the first reflective element 310 without the first adhesive layer)-measurement 2 | 54.17% | 55.48% |
| second reflectivity R2 (the second reflective element 320) | 63.17% | 62.08% |
| \|(R1 − R2)\|/Max (R1, R2) obtained from measurement 1 | 15.38% | 12.5% |
| \|(R1 − R2)\|/Max (R1, R2) obtained from measurement 2 | 14.24% | 10.6% |

TABLE 2

| | Sample 1 | | |
|---|---|---|---|
|  | first reflective element (with the first adhesive layer) | first reflective element (without the first adhesive layer) | second reflective element |
| u' | 0.2254 | 0.2248 | 0.2267 |
| v' | 0.5243 | 0.5240 | 0.5244 |
| u' (second reflective element) − u' (first reflective element) | 0.0013 | 0.0019 |  |
| v' (second reflective element) − v' (first reflective element) | 0.0001 | 0.0004 |  |
| $\sqrt{(u'_2 - u'_1)^2 + (v'_2 - v'_1)^2}$ | 0.0013 | 0.0020 |  |

As shown in Table 1 and Table 2, the measurement results of reflectivity and chromaticity of the first reflective element 310 before and after the first adhesive layer are removed (with and without the first adhesive layer) are similar. In addition, the value of |(R1−R2)|/Max (R1, R2) obtained from the first reflectivity R1 before and after the first adhesive layer are removed (with and without the first adhesive layer) and the second reflectivity R2 satisfy the formula described above, i.e. $0 \leq |(R1-R2)|/\text{Max}(R1, R2) < 20\%$. The chromaticity coordinates u1', v1', u2' and v2' obtained before and after the first adhesive layer are removed (with and without the first adhesive layer)-satisfy the following formula: $0 \leq \sqrt{(u_2'-u_1')^2+(v_2'-v_1')^2} \leq 0.006$.

Referring back to FIG. 1 and FIG. 2A, in some embodiments, a part of the second reflective element 320 may be overlapped with the first reflective element 310 from a top view (which is the same as the normal direction Z of the circuit board 100). With such a configuration, the tolerance for misalignment of the first reflective element 310 and the second reflective element 320 may be increased.

In some embodiments, the shape of the second reflective element 320 may be a T-shape. In some embodiments, part of the second reflective element 320 may be disposed in the light-reflecting region 100R, and other part of the second reflective element 320 may be overlapped with the light-emitting element 200 along the normal direction Z of the circuit board 10.

In some embodiments, the circuit board 100 may have a side 100S adjacent to the light guide plate 110 and be extending along the first direction X. The side 100S of circuit board 100 may be overlapped with the light guide plate 110 along the normal direction Z of the circuit board 100. There may be a first distance $L_{LB}$ between one of the plurality of light-emitting elements 200 and the side 100S of circuit board 100 along the second direction Y that is perpendicular to the first direction X. In addition, the second reflective element 320 may have a width $L_{PI}$ along the second direction Y, and the first distance $L_{LB}$ and the width $L_{PI}$ of the second reflective element 320 may satisfy the following formula: $0.5 \leq L_{PI}/L_{LB} \leq 1$. That is, the ratio of the width $L_{PI}$ to the first distance $L_{LB}$ may be greater than or equal to 0.5 and less than or equal to 1, for example, 0.6, 0.7, 0.8, or 0.9, but it is not limited thereto.

It should be noted that if the ratio $L_{PI}/L_{LB}$ is too small (for example, less than 0.5), the area of the circuit board 100 that is exposed may be too large, and therefore a color-shifting issue may occur.

In some embodiments, the first distance $L_{LB}$ may refer to the distance between the one of the plurality of light-emitting surfaces 200S and the side 100S of the circuit board 100 along the second direction Y. Moreover, the first distance $L_{LB}$ may refer to an average value obtained by measuring the distance between the light-emitting surface 200S and the side 100S in the light-reflecting region 100R three times at different positions. In some embodiments, the width $L_{PI}$ may refer to an average value obtained by measuring the width of the second reflective element 320 along the second direction Y three times, the three widths $L_{PI}$ may be respectively obtained by measuring at different positions. In addition, when the second reflective element 320 has the other part overlapped with the light-emitting element 200, the widths of the second reflective element 320 that are selected for calculating the average value should exclude the other part of the second reflective element 320 overlapped with the light-emitting element 200 along the normal direction Z of the circuit board 10.

In some embodiments, the second reflective element 320 may have a first side 320S-1, and the first side 320S-1 may be adjacent to the light-emitting element(s) 200 and extends along the first direction X. In some embodiments, there may be a distance d between the first side 320S-1 of the second reflective element 320 and one of the plurality of light-emitting elements 200 along the second direction Y that is perpendicular to the first direction X, and the distance d satisfies the following formula: $0 \le d \le 0.5$ mm. That is, the distance d between the first side 320S-1 and the light-emitting element 200 may be greater than or equal to 0 and less than or equal to 0.5 mm, for example, 0.1 mm, 0.2 mm, 0.3 mm, or 0.4 mm, but it is not limited thereto. It should be noted that, if the distance d between the first side 320S-1 and the light-emitting element 200 is too large (for example, greater than 0.5 mm), the area of the circuit board 100 that is exposed may be too large and therefore a color band may occur near the light-emitting surface 200S or the backlight module 10 may have a color-shifting issue.

Moreover, the distance d may refer to an average value obtained by measuring the distance between the first side 320S-1 and the light-emitting surface 200S in the light-reflecting region 100R three times at different positions, the three distances d may be respectively obtained by measuring at different positions. In addition, the distances d that are selected for calculating the average value should exclude the other part of the second reflective element 320 overlapped with the light-emitting element 200 along the normal direction Z of the circuit board 10.

In some embodiments, the second reflective element 320 may have a second side 320S-2. The second side 320S-2 is opposite to the first side 320S-1 and extends along the first direction X. In some embodiments, the second side 320S-2 of the second reflective element 320 may be adjacent to the side 100S of the circuit board 100. In some embodiments, there may be a distance d2 between the second side 320S-2 and the side 100S of the circuit board 100 in the second direction Y perpendicular to the first direction X. In some embodiments, the distance d2 may be greater than 0, that is, the second side 320S-2 may not be overlapped with the side 100S along the normal direction Z of the circuit board 100. For example, the side 100S may be protrude more than the second side 320S-2 in the second direction Y.

As described above, in some embodiments, the second reflective element 320 may not be in contact with the light guide plate 110 in the light-reflecting region 100R (as shown in FIG. 2B). Specifically, there may be a distance d1 between the second reflective element 320 and the light guide plate 110 along the normal direction Z of the circuit board 100. The distance d1 may be substantially the same as the thickness of the first reflective element 310 (as shown in FIG. 2A) along the normal direction Z of the circuit board 100. In some embodiments, the distance d1 may satisfy the following formula: $0 < \text{distance d1} \le 200$ μm. In some embodiments, the distance d1 may be greater than or equal to 50 μm and less than or equal to 100 μm, for example, 60 μm, 70 μm, 80 μm, or 90 μm, but it is not limited thereto.

It should be noted that if the distance d1 between the second reflective element 320 and the light guide plate 110 is too large (for example, greater than 200 μm), the amount of the light transmitting from the light-emitting element 200 to the light guide plate 110 may be decreased.

In some embodiments, the distance d1 may refer to an average value obtained by measuring the distance between the second reflective element 320 and the light guide plate 110 in any cross-section three times, the three distances d1 may be respectively obtained by measuring at different positions.

Referring to FIG. 2A and FIG. 2B, in some embodiments, the material of the third reflective element 120 may include metal, white materials (such white ink, white tape), other suitable reflective materials or a combination thereof, but it is not limited thereto. The third reflective element 120 may have a third reflectivity R3. In some embodiments, the third reflectivity R3 of the third reflective element 120 may be greater than the second reflectivity R2 of the second reflective element 320. It should be note that if the third reflectivity R3 is less than the second reflectivity R2, a bright band may be formed, and the optical quality of the backlight module 10 may be affected.

In some embodiments, the second reflectivity R2 and the third reflectivity R3 satisfy the following formula: $0 \le |(R2-R3)|/\text{Max}(R2,R3) < 50\%$. That is, the ratio of the absolute value of the difference of the second reflectivity R2 and the third reflectivity R3 to the maximum value of the second reflectivity R2 or the third reflectivity R3 (the one which is greater) may be greater than or equal to 0 and less than 50%. In some embodiments, the value of $|(R2-R3)|/\text{Max}(R2,R3)$ may be greater than or equal to 10% and less than or equal to 45%, for example, 15%, 20%, 25%, 30%, 35%, or 40%, but it is not limited thereto.

More specifically, in an embodiment, the second reflectivity R2 is 52.10%, the third reflectivity R3 is 99%, and the value of $|(R2-R3)|/\text{Max}(R2,R3)$ is 47.37%. In another embodiment, the second reflectivity R2 may be 63.17%, the third reflectivity R3 is 99%, and the value of $|(R2-R3)|/\text{Max}(R2,R3)$ may be 36.19%.

It should be noted that if the value of $|(R2-R3)|/\text{Max}(R2,R3)$ is too large (for example, greater than 50%), the extraction efficiency of the backlight module 10 may be decreased. Moreover, a bright band or dark band may be formed, and the optical quality of the backlight module 10 may be affected.

Moreover, in some embodiments, the third reflectivity R3 may refer to an average value obtained by measuring the reflectivity of the third reflective element 120 three times, the three times reflectivity of the third reflective element 120 may be respectively obtained by measuring at different parts of the third reflective element 120.

Figure 4:
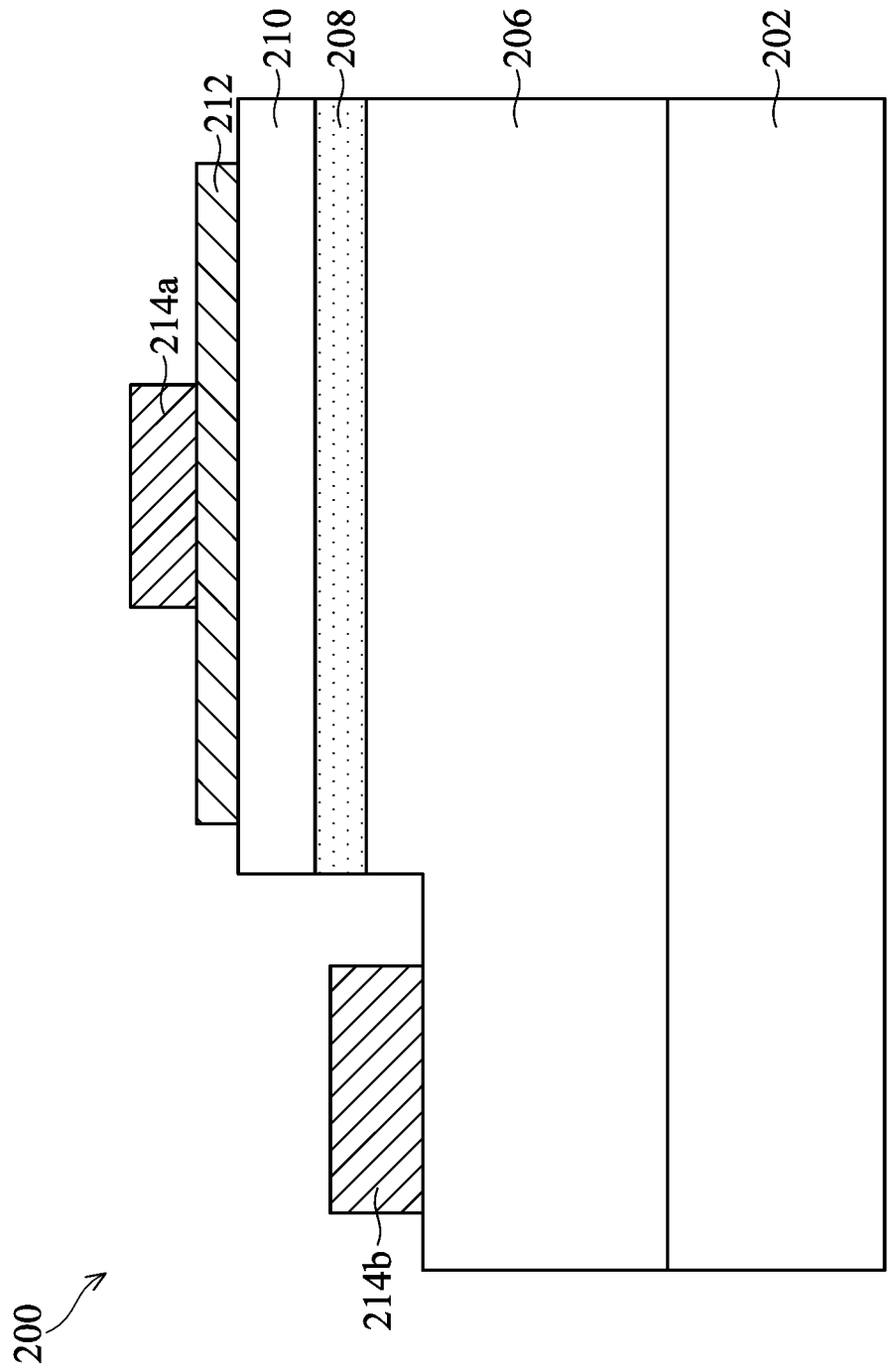
FIG. 4 is a cross-sectional diagram of a light-emitting element of a backlight module in accordance with some embodiments of the present disclosure.

Next, refer to FIG. 4, which is a cross-sectional diagram of the light-emitting element 200 of the backlight module 10 in accordance with some embodiments of the present disclosure. FIG. 4 illustrates an exemplary structure of the light-emitting element 200, but the present disclosure is not limited thereto.

As described above, the light-emitting element 200 may be an inorganic light-emitting diode in some embodiments. The light-emitting element 200 may include a substrate 202, a first semiconductor layer 206, a quantum well layer 208, a second semiconductor layer 210, a conductive layer 212, a first electrode 214a and a second electrode 214b, but it is not limited thereto.

Furthermore, the first electrode 214a and the second electrode 214b of the light-emitting element 200 may be electrically connected to the circuit board 100 through the conductive pads 216 of the circuit board 100 (shown in FIG. 1 and FIG. 2B).

In some embodiments, the first semiconductor layer 206 may be one of n-type semiconductor or p-type semiconductor, and the second semiconductor layer 210 may be another of n-type semiconductor or p-type semiconductor. The n-type semiconductor may include, but is not limited to, gallium nitride (n-GaN) or aluminum indium phosphide (n-AlInP) that is doped with tetravalent atoms. The p-type semiconductor may include, but is not limited to, gallium nitride (p-GaN) or aluminum indium phosphide (p-AlInP) that is doped with divalent atoms. In some embodiments, the quantum well layer 208 may include a single quantum well (SQW) or a multiple quantum well (MQW). The material of the quantum layer 208 may include, but is not limited to, gallium nitride, aluminum indium phosphide (AlInP), indium gallium nitride (InGaN), or a combination thereof.

In some embodiments, the material of the conductive layer 212 may include transparent conductive martial, such as indium tin oxide (ITO), tin oxide (SnO), zinc oxide (ZnO), indium zinc oxide (IZO), indium gallium zinc oxide (IGZO), indium tin zinc oxide (ITZO), antimony tin oxide (ATO), antimony zinc oxide (AZO), another suitable transparent conductive material, or a combination thereof. In some embodiments, the material of the first electrode 214a and the second electrode 214b may include a metallic conductive material.

It should be understood that the light-emitting element 200 may include the packaging component (not illustrated) in FIG. 4. FIG. 4 illustrates a bare die of light-emitting element 200. In addition, although the light-emitting element 200 illustrated in FIG. 4 has a vertical type structure, the light-emitting element 200 may have a flip-chip type structure in some other embodiments.

In the following description, various aspects of the backlight module are shown. It should be understood that the same or similar components or elements in above and below contexts are represented by the same or similar reference numerals. The materials, manufacturing methods and functions of these components or elements are the same or similar to those described above, and thus will not be repeated herein.

Figure 5:
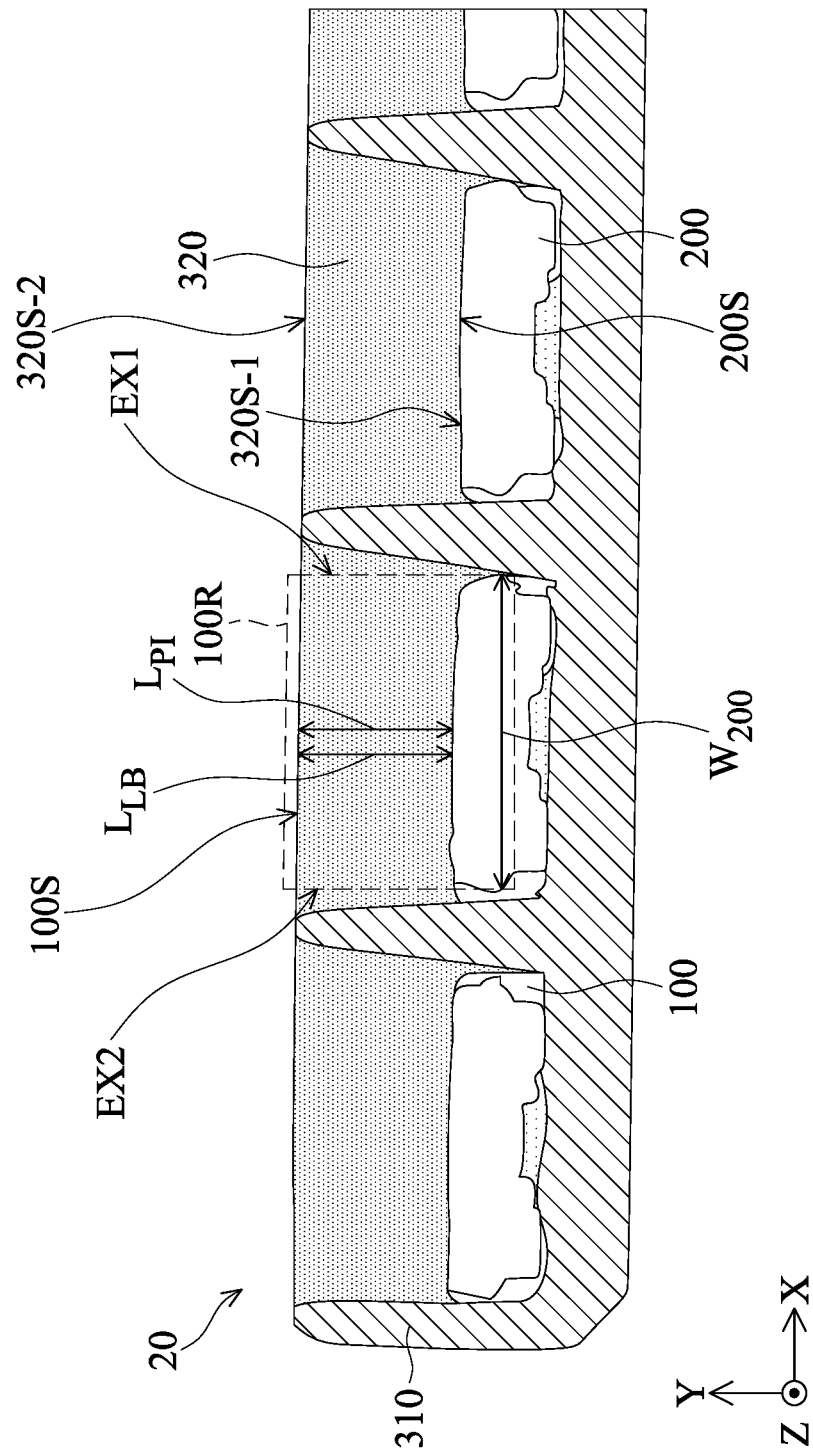
FIG. 5 is a partial top-view diagram of a backlight module in accordance with some embodiments of the present disclosure.

Refer to FIG. 5, which is a partial top-view diagram of a backlight module 20 in accordance with some other embodiments of the present disclosure. As shown in FIG. 5, in some embodiments, there may be no distance between the first side 320S-1 of the second reflective element 320 and one of the light-emitting surfaces 200S in one of the light-reflecting regions 100R in the second direction Y. In other words, part of the second reflective element 320 (such as the second side 320S-2) may be substantially overlapped with one of the plurality of the light-emitting elements 200 along the normal direction Z of the circuit board 100. Therefore, the distance d2 between the second side 320S-2 and the side 100S of circuit board 100 in the second direction Y may be zero. Furthermore, the first distance $L_{LB}$ between one of the light-emitting elements 200 and the side 100S may be substantially the same as the width $L_{PI}$ of the second reflective element 320 in the second direction Y.

Figure 6:
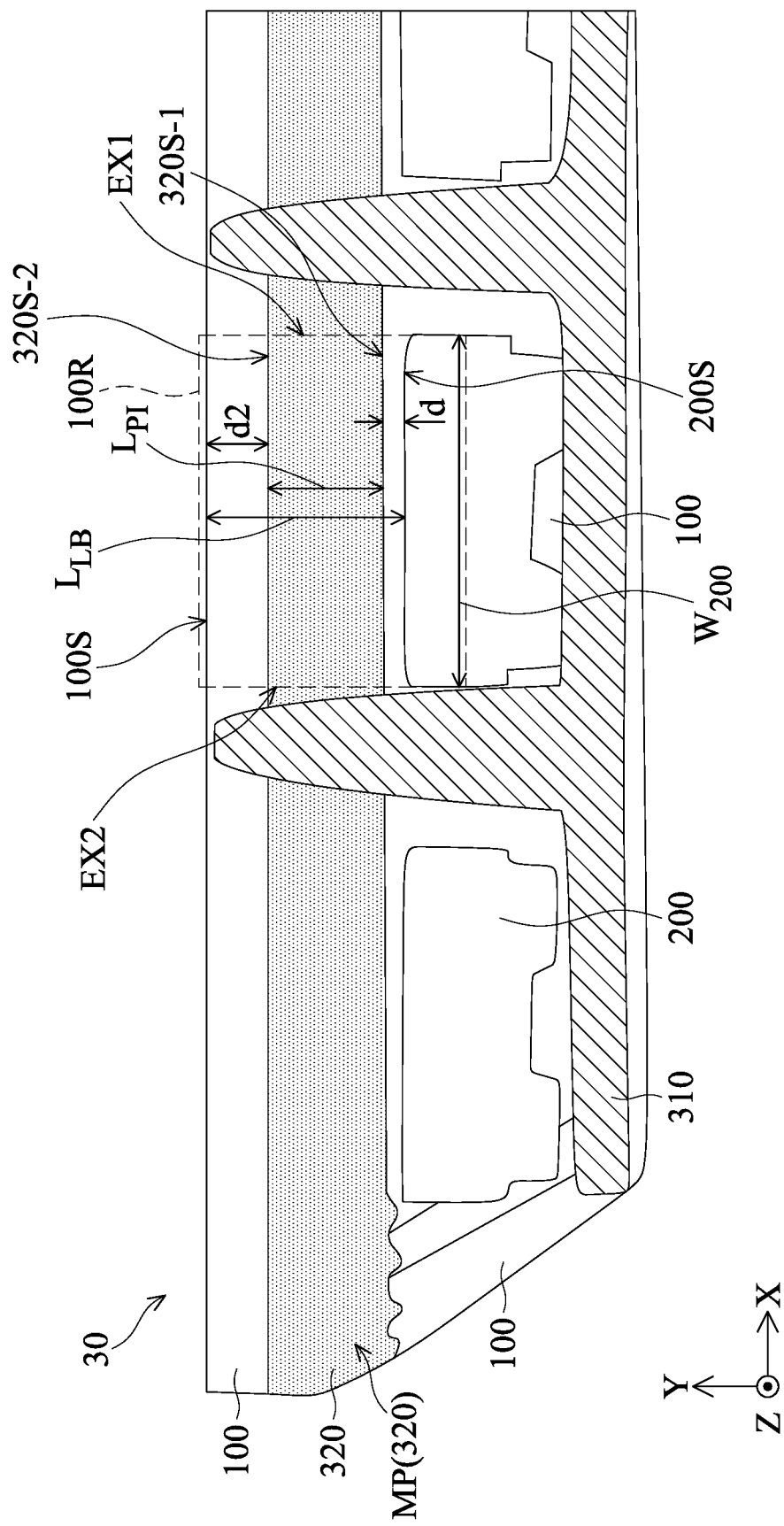
FIG. 6 is a partial top-view diagram of a backlight module in accordance with some embodiments of the present disclosure.

Refer to FIG. 6, which is a partial top-view diagram of a backlight module 30 in accordance with some other embodiments of the present disclosure. As shown in FIG. 6, in some embodiments, the shape of the second reflective element 320 may be substantially a strip shape. The distance d may exist between the first side 320S-1 of the second reflective element 320 and the light-emitting surface 200S in the second direction Y. The first distance $L_{LB}$ may be greater than the width $L_{PI}$, that is, the distance d2 may exist between the second side 320S-2 and the side 100S in the second direction Y. In some embodiments, the first reflective element 310 may not be overlapped with the light-reflecting region 100R along the normal direction Z of the circuit board 100.

Figure 7:
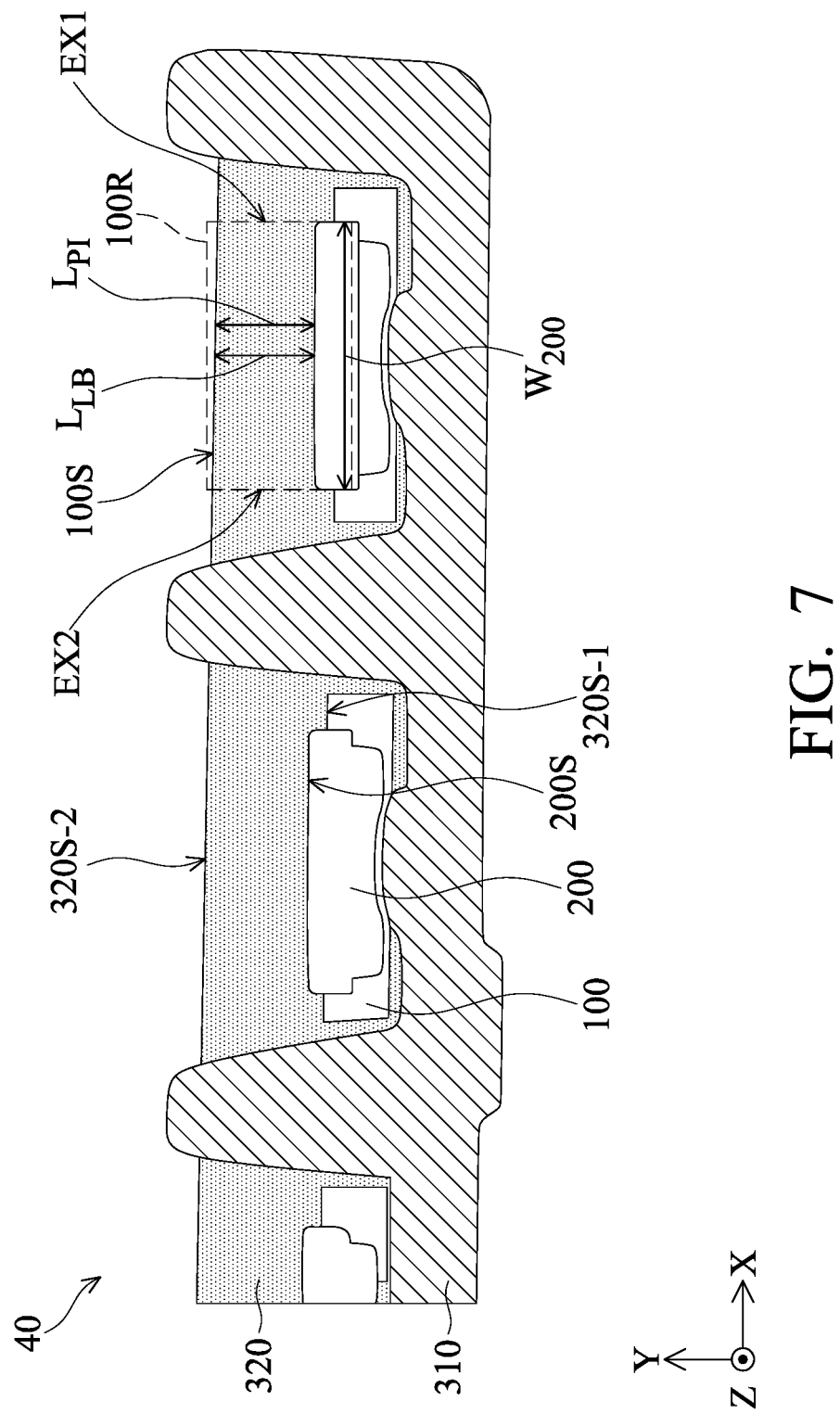
FIG. 7 is a partial top-view diagram of a backlight module in accordance with some embodiments of the present disclosure.

Refer to FIG. 7, which is a partial top-view diagram of a backlight module 40 in accordance with some other embodiments of the present disclosure. As shown in FIG. 7, in some embodiments, there may be no distance between the first side 320S-1 of the second reflective element 320 and the light-emitting surface 200S of the light-emitting element 200 in the light-reflecting region 100R in the second direction Y. In some embodiments, the second reflective element 320 may be partially overlapped with the light-emitting element 200 along the normal direction Z of the circuit board 100. In addition, the first reflective element 310 may slightly protrude outward the side 100S of circuit board 100 (or the second side 320S-2 of the second reflective element 320) in the second direction Y. In other words, part of the first reflective element 310 may not be overlapped with the circuit board 100 along the normal direction Z of the circuit board 100. In some embodiments, the first distance $L_{LB}$ between the light-emitting element 200 and the side 100S may be substantially the same as the width $L_{PI}$ of the second reflective element 320 in the second direction Y. In some embodiments, the first reflective element 310 may not be overlapped with the light-reflecting region 100R along the normal direction Z of the circuit board 100.

Figure 8:
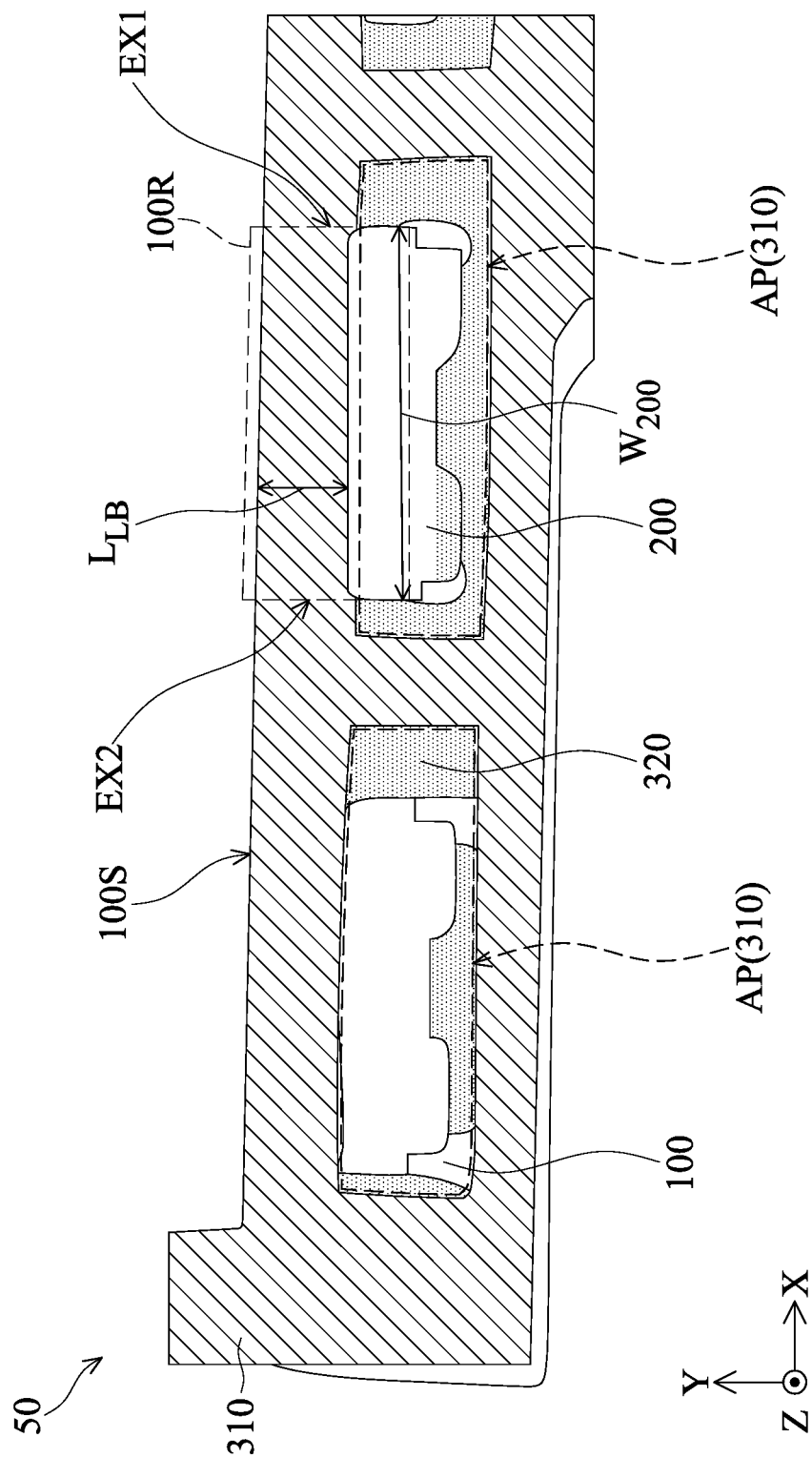
FIG. 8 is a partial top-view diagram of a backlight module in accordance with some embodiments of the present disclosure.

Refer to FIG. 8, which is a partial top-view diagram of a backlight module 50 in accordance with some other embodiments of the present disclosure. As shown in FIG. 8, in some embodiments, the first reflective element 310 may surround the light-emitting element(s) 200 and overlapped with at least part of the light-reflecting region(s) 100R along the normal direction Z of the circuit board 100. The first reflective element 310 may be overlapped with the side 100S of the circuit board 100 along the normal direction Z of the circuit board 100. In some embodiments, the shape of the first reflective element 310 may be a grid shape, the first reflective element 310 may have the apertures AP, and the second reflective element 320 may be overlapped with the apertures AP of the first reflective element 310 along the normal direction Z of the circuit board 100.

Figure 9:
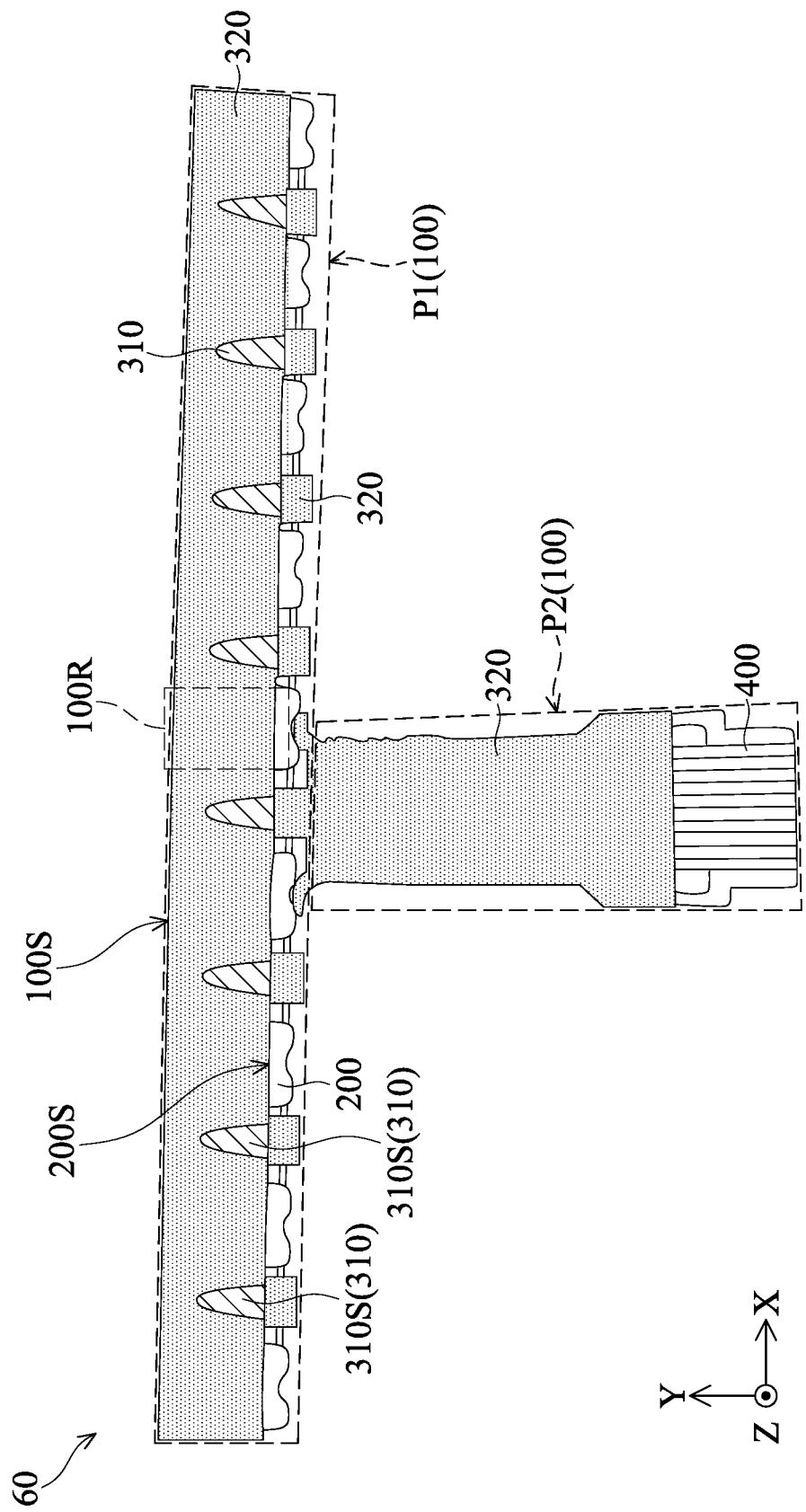
FIG. 9 is a partial top-view diagram of a backlight module in accordance with some embodiments of the present disclosure

Refer to FIG. 9, which is a partial top-view diagram of a backlight module 60 in accordance with some other embodiments of the present disclosure. As shown in FIG. 9, in some embodiments, the first reflective element 310 may have a plurality of sub-parts 310S separated from each other, a shape of at least one of the plurality of sub-parts 310S may be a tapered shape or a bullet shape. The sub-parts 310S may be disposed between the light-emitting elements 200 respectively and are not overlapped with the light-reflecting region 100R along the normal direction Z of the circuit board 100. In some embodiments, the sub-parts 310S of the first reflective element 310 and the light-emitting elements 200 may be alternately arranged along the first direction X. In addition, the circuit board 100 may have a first part P1 and a second part P2 connected with the first part P1, the first part P1 may extend along the first direction X, and a second part P2 may extend along the second direction Y. The light-emitting elements 200 may be disposed on the first part P1, and the second part P2 may be away from the side 100S of the circuit board 100. In some embodiments, a part of the second reflective element 320 may be overlapped with the first part P1 along the normal direction Z of the circuit board 100, but the part of the second reflective element 320 may not be overlapped with the conductive pads 216 of the circuit board 100 (shown in FIG. 1) along the normal direction Z of the circuit board 100. In some embodiments, the second reflective element 320 may be overlapped with a part of the second part P2 along the normal direction Z of the circuit board 100, and another part of the second part P2, which is not overlapped with the second reflective element 320 may be used as a connector 400. In some embodiments, the external signals can transmit to the light-emitting elements 200 through the connector 400.

Figure 10:
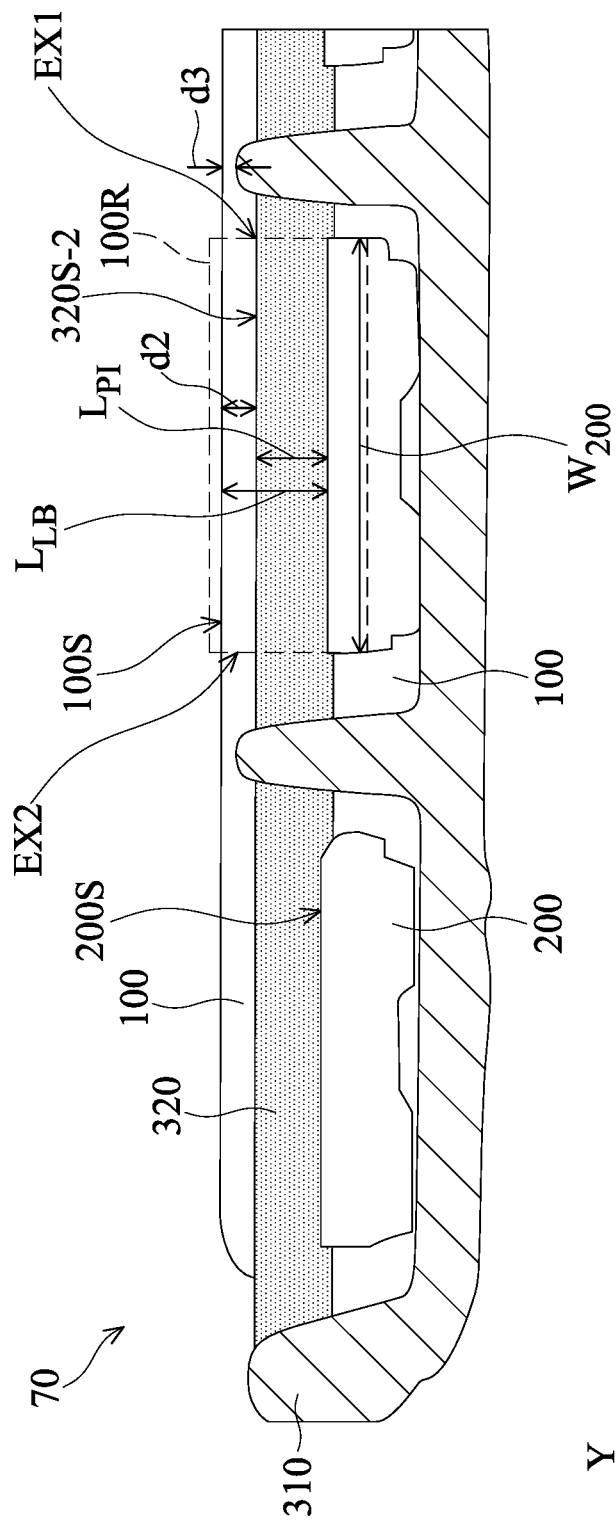
FIG. 10 is a partial top-view diagram of a backlight module in accordance with some embodiments of the present disclosure.

Refer to FIG. 10, which is a partial top-view diagram of a backlight module 70 in accordance with some other embodiments of the present disclosure. As shown in FIG. 10, in some embodiments, the shape of the second reflective element 320 may be a strip shape. There may be no distance between the first side 320S-1 of the second reflective element 320 and the light-emitting surface 200S of one of the light-emitting elements 20 in the light-reflecting region 100R. In some embodiments, part of the first reflective element 310 may protrude outward the second side 320S-2 of the second reflective element 320 in the second direction Y. In other words, a minimum distance d3 between the first reflective element 310 and side 100S in the second direction Y is less than the distance d2 between the second side 320S-2 and the side 100S of the circuit board 100 in the second direction Y. Furthermore, the first distance $L_{LB}$ between the light-emitting element 200 and the side 100S may be greater than the width $L_{PI}$ of the second reflective element 320. In some embodiments, the first reflective element 310 may not be overlapped with the side 100S of the circuit board 100 along the normal direction Z of the circuit board 100, the first reflective element 310 may not protrude outward than the side 100S of the circuit board 100 in the second direction Y. In other words, there is the minimum distance d3 between the first reflective element 310 and side 100S.

To summarize the above, in accordance with some embodiments of the present disclosure, the backlight module includes the first reflective element and the second reflective element that are arranged in a specific configuration. In addition, the reflectivity of the first reflective element and the second reflective element are designed to follow a certain formula. With such a specific configuration, the extraction efficiency of the backlight module can be improved. Therefore, the performance or reliability of the electronic device can be enhanced.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods or steps. In addition, each claim constitutes an individual embodiment, and the claimed scope of the present disclosure includes the combinations of the claims and embodiments. The scope of protection of present disclosure is subject to the definition of the scope of the appended claims. Any embodiment or claim of the present disclosure does not need to meet all the purposes, advantages, and features disclosed in the present disclosure.

What is claimed is:

1. A light-emitting device, comprising:
a circuit board;
a plurality of light-emitting elements arranged on the circuit board;
a first reflective element disposed on the circuit board; and
a second reflective element disposed on the circuit board;
wherein the first reflective element has a first reflectivity R1, the second reflective element has a second reflectivity R2, the first reflectivity R1 is different from the second reflectivity R2, and the first reflectivity R1 and the second reflectivity R2 satisfy the following formula:

$$0 < |(R1-R2)|/\text{Max}(R1,R2) < 20\%.$$

2. The light-emitting device as claimed in claim 1, wherein the second reflectivity R2 is greater than the first reflectivity R1.

3. The light-emitting device as claimed in claim 1, wherein the first reflective element comprises a first white material, and the second reflective element comprises a second white material.

4. The light-emitting device as claimed in claim 1, wherein a part of the second reflective element is overlapped with the first reflective element along a normal direction of the circuit board.

5. The light-emitting device as claimed in claim 1, wherein a shape of the second reflective element is a strip shape, T-shape or a grid shape.

6. The light-emitting device as claimed in claim 1, wherein a part of the second reflective element is overlapped with one of the plurality of light-emitting elements along a normal direction of the circuit board.

7. The light-emitting device as claimed in claim 1, wherein the first reflective element having a plurality of sub-parts separated from each other, and the plurality of sub-parts and the plurality of light-emitting elements are alternately arranged on the circuit board.

8. The light-emitting device as claimed in claim 7, wherein at least one of the plurality of sub-parts has a tapered shape or a bullet shape.

9. The light-emitting device as claimed in claim 1, further comprising a third reflective element disposed adjacent to the circuit board, wherein the third reflective element has a third reflectivity R3 greater than the second reflectivity R2.

10. The light-emitting device as claimed in claim 9, wherein the second reflectivity R2 and the third reflectivity R3 satisfy the following formula:

$$0 \leq \sqrt{(u_2'-u_1')^2+(v_2'-v_1')^2} \leq 0.006.$$

11. The light-emitting device as claimed in claim 1, wherein the first reflective element surrounds at least one of the plurality of light-emitting elements.

12. The light-emitting device as claimed in claim 1, wherein a light emitted from a halogen lamp is respectively reflected by the first reflective element and the second reflective element, and lights reflected by the first reflective element and the second reflective element respectively have corresponding coordinates (u1',v1') and (u2',v2') in a CIE1976 color space, and u1', v1', u2' and v2' satisfy the following formula:

$$0 \le \sqrt{(u_2'-u_1')^2+(v_2'-v_1')^2} \le 0.006.$$

13. The light-emitting device as claimed in claim 1, further comprising a light guide plate disposed on the circuit board, wherein the circuit board has a side overlapping with the light guide plate, a first distance $L_{LB}$ is between one of the plurality of light-emitting elements and the side of the circuit board, the second reflective element has a width $L_{PI}$ and the first distance $L_{LB}$ and the width $L_{PI}$ of the second reflective element satisfy the following formula:

$$0.5 \le L_{PI}/L_{LB} \le 1.$$

14. The light-emitting device as claimed in claim 1, wherein the second reflective element has a first side adjacent to the plurality of light-emitting elements and extending along a first direction, a distance d is between the first side of the second reflective element and one of the plurality of light-emitting elements along a second direction perpendicular to the first direction, and the distance d satisfies the following formula:

$$0 \le d \le 0.5 \text{ mm}.$$

15. The light-emitting device as claimed in claim 14, wherein the second reflective element has a second side opposite to the first side and extending along the first direction, and a distance d2 is between the second side and a side of the circuit board along the second direction.

16. The light-emitting device as claimed in claim 1, further comprising a light guide plate disposed on the circuit board, wherein a distance d1 between the second reflective element and the light guide plate along a normal direction of the circuit board satisfies the following formula:

$$0 < d1 \le 200 \text{ μm}.$$

17. An electronic device, comprising:
a display panel; and
a light-emitting device disposed below the display panel and comprising:
  a circuit board;
  a plurality of light-emitting elements arranged on the circuit board;
  a first reflective element disposed on the circuit board; and
  a second reflective element disposed on the circuit board;
wherein the first reflective element has a first reflectivity R1, the second reflective element has a second reflectivity R2, the first reflectivity R1 is different from the second reflectivity R2, and the first reflectivity R1 and the second reflectivity R2 satisfy the following formula:

$$0 < |(R1-R2)|/\text{Max}(R1,R2) < 20\%.$$

18. The electronic device as claimed in claim 17, wherein the second reflectivity R2 is greater than the first reflectivity R1.

19. The electronic device as claimed in claim 17, wherein the light-emitting device further comprises a third reflective element disposed adjacent to the circuit board, and the third reflective element has a third reflectivity R3 greater than the second reflectivity R2.

20. The electronic device as claimed in claim 17, wherein a light emitted from a halogen lamp is respectively reflected by the first reflective element and the second reflective element, and lights reflected by the first reflective element and the second reflective element respectively have corresponding coordinates (u1',v1') and (u2',v2') in a CIE1976 color space, and u1', v1', u2' and v2' satisfy the following formula:

$$0 \le \sqrt{(u_2'-u_1')^2+(v_2'-v_1')^2} \le 0.006.$$

* * * * *